April 4, 1944.  C. W. ATTWOOD  2,345,650
SKELETONIZED STRUCTURE.
Filed Oct. 12, 1940  2 Sheets-Sheet 1
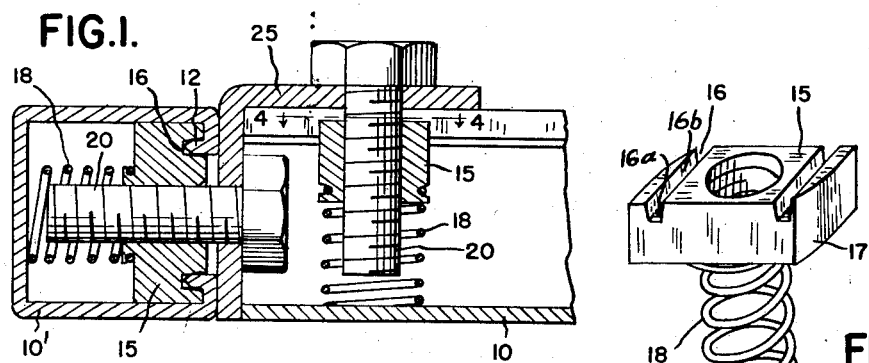
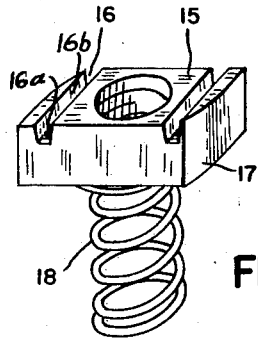
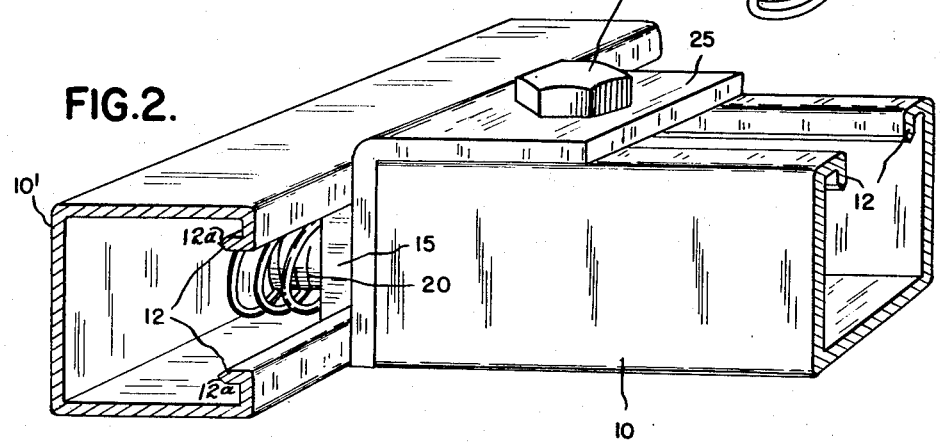
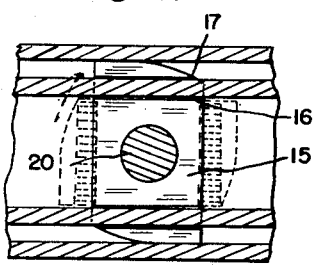
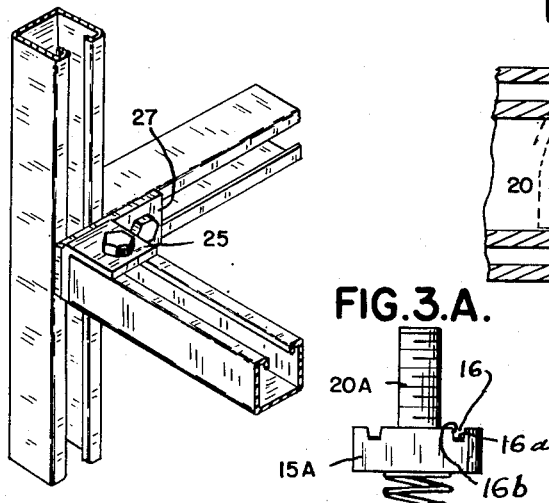
INVENTOR.
CHARLES W. ATTWOOD
BY
ATTORNEYS April 4, 1944.  C. W. ATTWOOD  2,345,650
SKELETONIZED STRUCTURE
Filed Oct. 12, 1940  2 Sheets-Sheet 2

INVENTOR.
CHARLES W. ATTWOOD
BY
ATTORNEYS

Patented Apr. 4, 1944

2,345,650

UNITED STATES PATENT OFFICE 2,345,650

SKELETONIZED STRUCTURE

Charles W. Attwood, Wayne, Mich.

Application October 12, 1940, Serial No. 360,868

2 Claims. (Cl. 189—36)

This invention relates to building and structural elements for the construction of skeletonized reinforcing and supporting structures, ladders, scaffolding, rails, frames, struts and the like.

A particular object of the invention is to provide novel and improved metallic strut means, together with bracing, securing and clamping means for interconnecting and connecting other objects to the same, in a very simple, quick and inexpensive manner.

Another object of the invention is to provide improved means whereby structures of the indicated and other types, of great strength, may be erected more quickly and easily than is now possible, with the expenditure of less effort and labor in the field, and without the necessity of drilling or forming the material. In fact the only tool necessary to be used, if the struts have been cut to the proper length in the shop, is a wrench or screwdriver, while a saw is of course also necessary if the strut is to be cut on the job.

It is the present practice, where skeletonized metallic structures are required, as in the support of electrical equipment, in the construction of scaffolding and the like, to employ either angle iron or simple steel tubing of circular cross section. With either of these, much labor must be expended in fabrication.

If such a structure is to be changed or enlarged or additional equipment must be attached, particularly where a rearrangement or removal of some of the parts already erected is required, not only is the operation difficult in itself, but it is difficult to conceal unsightly holes and specially configured parts which were necessary in the structure as it existed before the alteration.

Another object is to provide a novel sheet metal strut, of generally channeled form, and in conjunction therewith to provide novel fastening means, and coupling and bracing elements, so designed as to make it possible to construct, easily and quickly, a structure almost any desired shape and character.

Still another object is to provide such strut-type construction materials so designed that firm attachment to any point along any of the struts, or at the ends of the struts may be made at any time, as well when the struts are incorporated in a previously erected structure as before such erection, which attachment may be made without disturbing or removing previously attached parts, and without access to either end of the strut to which a part is to be attached, where the attachment is required to be made to an intermediate portion of a strut. An object related to that last stated is to provide such a structural material whose complete disassembly, and from which the removal of attached parts, may be effected with equal ease, and without leaving any unsightly marred or perforated parts to indicate that such an alteration or removal has been made.

A related object is to provide a novel channeled strut element formed of sheet metal and having inturned spaced holding flanges adapted to cooperate with novel screw-threaded holding means, also forming a part of my invention, and interengageable with said flanges in such manner as to firmly grip the structural element at any desired point therealong.

Still another object is to provide securing and holding portions for interconnecting strut elements of the class described, which securing and holding portions are proportioned in a novel manner with respect to each other and with respect to said strut elements, whereby the strut elements may be extended in any desired direction with relation to one another, and turned as desired about their longitudinal axes.

Still another object is to provide improved means for attaching pipe, beams and other conventional building and service elements to my novel and improved strut elements, to enable the supporting of either by the other, with great rigidity, but in a manner which allows ready separation of the parts at will.

Other objects and advantages will be apparent from the following description, wherein reference is made to the accompanying drawings, illustrating a preferred embodiment of my invention and wherein similar reference numerals designate similar parts throughout the several views.

In the drawings:

Figure 1 is a substantially central longitudinal sectional view of a pair of my improved strut elements arranged at right angles to one another and secured together by my improved fastening means, the latter also being shown in section.

Figure 2 is a perspective view of the parts shown in Figure 1.

Figure 3 is a perspective view of one of my improved nuts, and the friction means for initially positioning the same with relation to the strut.

Figure 3A is a view similar to Figure 3 showing a bolt, having a head formed similarly to the nut of Figure 3.

Figure 4 is a sectional view taken substantially on the line 4—4 of Figure 1 and looking in the direction of the arrows.

Figure 5 is a perspective view similar to Figure 2 but on a smaller scale and showing struts secured together in a somewhat different manner.

Figure 8:
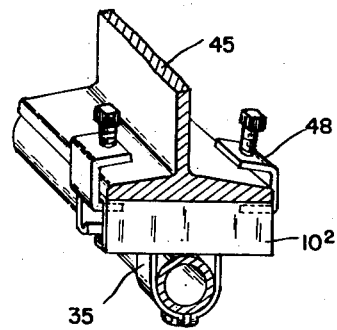
Figure 8 is a similar fragmentary perspective view showing additional holding means whereby such a pipe may be attached to a steel beam or equivalent part of a building structure.

Referring now to the drawings: Figures 1, 2 and 5 illustrate the preferred form of my improved structural element, or strut, which is formed of sheet metal and of substantially squared U-section. One such strut is generally designated 10, in Figures 1 and 2, which illustrate the manner of attachment thereof to an adjacent and connected strut 10'. Along the open face of the channel are flanges 12, which project inwardly toward one another and thence downwardly toward the base of the channel forming longitudinal ribs. The free edges 12a of the channels are oppositely beveled to impart a sharpened or pointed cross section thereto, for a purpose which will presently appear.

Where the structural work is fully designated in advance, the struts may be cut to the required lengths in the shop or during fabrication, although they may also be cut on the job, by means of a simple hand or power hack saw. The means for supporting the struts at their ends, and for attaching interconnected struts and other objects thereto, for bracing, or to support desired parts, consists of threaded nut and bolt portions, either the nut or the bolt must be of special design, but the other may be of any standard or suitable type. As shown in Figures 1, 2 and 3, the nut 15 is constructed to fit inside the channel, being narrower than the spacing between the flanges 12, but longer than such spacing. It will be seen that the nut may be inserted in the channel at any point simply by turning the nut parallel to the flanges and pressing it into the space therebetween. The nut is then turned at right angles to the channel, so that its ends underhang and are retained by the flanges 12. The face of the nut which engages flanges 12 is provided with slots 16 adapted to receive the flanges 12 when the nut is tightened into place, as shown in Figure 1. When tightened in place as shown, the two flanged sides of the strut are rigidly tied together, and the strut is thus reinforced at the point of load. The bottoms of the slots 16 are provided with upstanding teeth or serrations 16a which, when the nut is drawn up tight, bite into the pointed extremities of the flanges and to assist in retaining the nut in position by positively locking it against longitudinal sliding movement, the nut being hardened, or formed of harder stock than the strut. The side walls 16b of the slots 16 are inclined and diverge outwardly or upwardly from the bottom of the slots. The beveling of the free edges 12a of the longitudinal ribs or flanges 12 facilitates entry of the ribs or flanges 12 into the slots 16 and eliminate any liability of the ribs biting into the face of the nut 15 when the slots are alined with the ribs.

In assembling the nut in the channel member, the initially smooth free edges 12a contact with the smooth inclined side walls of the slots 16 which permits the nut to be readily shifted into accurate position if any such adjustment is necessary. After the accurate positioning of the nut, the latter is drawn up into tight engagement with the reduced beveled free edges of the ribs and causes the teeth in the bottom of the slots to bite into the reduced edges 12a. This operation of drawing the teeth of the nut into engagement with the free edges of the ribs or flanges will bring said ribs or flanges into true properly spaced parallelism which is essential to assembly of auxiliary devices. As the channel member is constructed of sheet metal, the ribs or flanges, from various causes, are frequently not in true parallelism and properly spaced relation. The nut may be of a length slightly less than the spacing between the sides of the channel member and any flexing or bending of the flanges 12 from their true position will be corrected when they are in engagement with the side walls of the slots near the bottoms thereof.

A spring 18 is secured to and projects from the opposite or bottom face of the nut, being large enough in diameter to allow the stem of the bolt 20 to pass freely therethrough, as shown in Figure 1. The spring is compressed against the bottom of the channel when the nut is in place, friction being thus imposed on the nut to temporarily hold it against sliding in the channel due to its own weight, or as the result of vibration, prior to its securance by the bolt. This will be seen to enable the nuts to be placed in advance, even in vertically extending channels, without danger of displacement, while the parts to be attached may be secured in place at any time, simply by thrusting the complementary bolt portions thereinto and tightening the same.

As best shown in Figure 4, the length of the nut is substantially equal to the distance between the side webs of the channel. Diagonally opposite corners of the nut are rounded, as indicated at 17, so that the nut may be turned from the initial position of insertion, indicated in dotted lines in Figure 4, to its position of use, indicated in full lines in that view, by a quarter turn to the right, or clockwise to the full line position. At this point further rotation of the nut is prevented by the unreduced corners, which thus assist in holding the nut against turning as the bolt is tightened, and insure proper alignment of the slots 16 with the flanges 12 during the initial positioning of the nuts. The bolt 20 may be of a conventional or any desired type.

It will be apparent that, as shown in Figure 3A, the head 15A of the bolt 20A may be constructed similarly to the nut 15 previously described, in which event a standard nut may be used. The bolt head, rather than the nut, is then inserted in the channel, and the stem projects from the channel to receive the parts to be attached. The stem forms a convenient handle for inserting the head, and the parts to be attached to the strut may very easily be applied to the projecting stem. Any suitable nut, as 15A, or other tapped member may of course be used in conjunction with the bolt.

In Figures 1 and 2 an angle bracket 25 is shown, in conjunction with two nut and bolt assemblies, employed to secure together two struts in coplanar relation, the end of one strut abutting an intermediate portion of the other. One side of the angle bracket is of such size as to cover the end of the terminating strut. The hole in this face of the angle is formed in such position as to lie centrally of the other strut, so that the nut is properly located in the channel. It will be understood that such angle brackets may be formed with their webs at angles other than the 90° arrangement shown, as well as with webs twisted to lie in different planes. A variety of suitable standardized brackets are preferably supplied, such as those shown in Figures 5 and 9.

When the slotted faces of abutting struts are to lie in one plane, flat brackets as 27 are used similarly perforated at proper distances to receive the stems of the bolts.

In order to provide increased resistance to turning of the strut about its own axis, where it is supported only at its ends by axial bolts, as is the strut 10 in Figures 2 and 5, the face of the angle bracket 25 which overlies the end of the strut may be dipped in quick drying lacquer then in emery or carborundum dust. The great friction thus obtained effectively prevents turning of the angle bracket and thus of the strut when the bolt is tightened.

Figure 6:
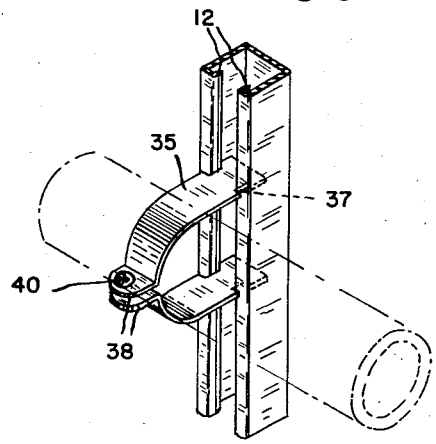
Figure 6 is a perspective view of one of my improved strut elements, showing means for securing a pipe thereto.
Figure 7:
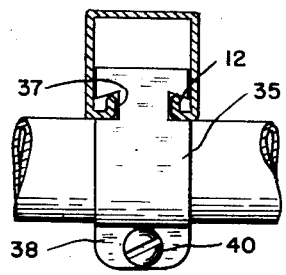
Figure 7 is a transverse section of the strut, pipe and pipe-hanger assembly of Figure 6.

For attaching pipe to the struts, I provide strap metal clamps, each of which is formed in two identical sections 35. These stand transversely of the channeled strut, and project thereinto when in use, the width of the strap metal being substantially the same as the internal width of the channel. Opposite edges of the strap members, near their inner ends, are kerfed, as indicated at 37, to receive and overengage the flange portions 12. The outer end of each strap is formed to embrace half of the pipe, the outer extremities of the two strap sections being curved toward one another, as shown in Figure 6, and provided with out-turned parallel and correspondingly apertured lugs 38 at their extremities adapted to receive a nut and bolt assembly, 40, or other suitable clamping means. The straps are so proportioned that when the nut and bolt are tightened, and the lugs 38 drawn toward one another, the straps are tightened against the flanged section of the channel element before the lugs 38 meet, as a consequence of which the straps force the pipe tightly against the strut. The flange-engaging edges of the kerfed portions of the straps are also so sloped, as best shown in cross sectional Figure 7, as to tend to draw the two flanges and so the sides of the strut together, and brace them against spreading and buckling.

Figure 8 illustrates the combined use of strap hangers 35, such as just described, together with short sections 10² of my improved strut elements, to support a pipe along and parallel to one face of an I-beam 45. The strut sections are arranged transversely of the beam, and substantially correspond in length to the width of the bottom flange of the beam, as shown in Figure 8. Simple clamps 48 are fitted into the ends of the channel and overlie the beam, and when tightened, hold the channel firmly in place against the beam, strap-type hangers 35 being in turn inserted in the channel in the manner already described.

Figure 9:
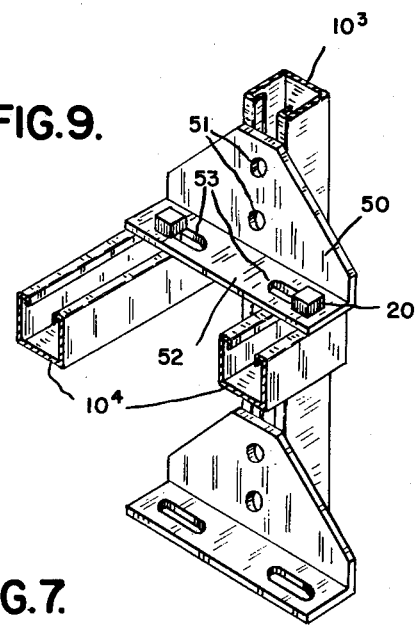
Figure 9 is a fragmentary perspective view showing, in conjunction with a plurality of my improved struts, additional novel bracing and securing means for interconnecting the same.
Figure 10:
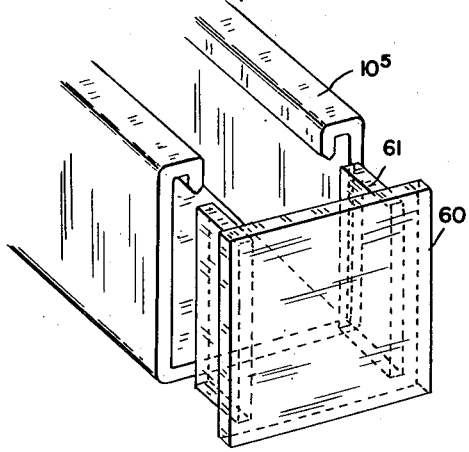
Figure 10 is a fragmentary perspective view of the end of one of my channeled structural elements, illustrating a closure cap therefor.

In Figure 9 a further special structural element is illustrated whereby a plurality of struts may be attached to a single strut, to be supported by or to support the same. The element is in the form of an angle bracket 50 having one web adapted to lie against the open face of the strut 10³ to which others are to be attached, perforations being provided at 51 in such manner that bolt and nut means of the variety previously described may be used to attach it to the strut. An out-turned flange 52 of the angle bracket is provided with longitudinal slots 53 for bolts 20, the latter being adapted to secure additional struts, as 10⁴ in the manner shown. In this manner, it will be noted, shelf-like supports of greater width than a single strut may be provided, adapted to support any desired equipment or apparatus.

Where an end of the channeled structural element as 10⁵, would be exposed to view, a cap, as 60 is provided in the form of a simple flat plate, having ribs 61 projecting from one face thereof and spaced conformably to the spacing between the side webs of the channel. Ribs 61 are thinner than the distance between flanges 12 and the side webs of the channel, and project therebetween to secure the cap in place.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Structural means of the class described comprising in combination a channel sheet metal member of substantially square U-section having side webs and a connecting web and provided at the open side of the channel with inwardly extending flanges having inturned portions forming longitudinal ribs each beveled at their edge portion to a pointed cross-section, a screw threaded element having a body portion of a length to extend under said flanges and a width less than the space between said longitudinal ribs and provided with transversely tapered slots each having inwardly converging side walls, said slots being spaced conformably to the spacing of said ribs when the latter are accurately spaced and adapted, when the screw threaded element is carried into engagement with said ribs, to draw the latter into their accurately spaced positions with the inclined side walls of the slot in engagement with the ribs, and a cooperating screw threaded means inter-engageable with said screw threaded element.

2. Structural means of the class described comprising in combination a channel sheet metal member of substantially square U-section provided at the open side of the channel with inwardly extending flanges having inturned portions forming longitudinal ribs each having their longitudinal free edges beveled at their edge portion to a pointed cross-section, a screw threaded element having a body portion of a length to extend under said flanges and a width less than the space between said longitudinal ribs and provided with transversely tapered slots each having smooth inwardly converging inclined side walls, said slots being spaced conformably to the spacing of said ribs when the latter are accurately spaced and adapted, when the screw threaded element is carried into engagement with said ribs, to draw the latter into their accurately spaced positions with the inclined side walls of the slots in engagement with the ribs, a cooperating screw threaded means inter-engageable with said screw threaded element, said slots being provided at their bottoms with teeth adapted to be embedded in the reduced free edges of the ribs to prevent sliding movement of the screw threaded member longitudinally of the ribs, and a spring carried by said screw threaded element and frictionally engaging the channel member interiorly thereof and compressed against the bottom of the channel member when the screw threaded element is in place to temporarily hold it against sliding in said channel.

CHARLES W. ATTWOOD.